United States Patent [19]

Johnson

[11] 4,116,383
[45] Sep. 26, 1978

[54] METHOD AND APPARATUS FOR MIXING FLUID

[75] Inventor: Bruce Virgil Johnson, Manchester, Conn.

[73] Assignee: United Technologies Corporation, Hartford, Conn.

[21] Appl. No.: 767,594

[22] Filed: Feb. 10, 1977

[51] Int. Cl.² .................................. B05B 7/00
[52] U.S. Cl. ........................ 239/8; 239/406; 239/424.5; 239/557; 239/558
[58] Field of Search .............. 239/400, 404, 8, 406, 239/549, 557, 558, 424.5, 422, 425, 548; 60/39.74 A, 258

[56] References Cited

U.S. PATENT DOCUMENTS

| | | | |
|---|---|---|---|
| 1,800,281 | 4/1931 | Buschler | 239/558 |
| 2,567,485 | 9/1951 | Jenny | 239/406 |
| 3,397,537 | 8/1968 | Green, Jr. | 60/39.74 A |
| 3,625,435 | 12/1971 | Mitchell et al. | 39/422 |
| 3,675,425 | 7/1972 | Scannell et al. | 239/404 X |

FOREIGN PATENT DOCUMENTS 2,151,074 10/1971 Fed. Rep. of Germany ........... 239/404

*Primary Examiner*—John J. Love
*Attorney, Agent, or Firm*—Anthony J. Criso

[57] ABSTRACT

Methods and apparatus for mixing fluids which pass through a plurality of fluid passageways arranged as a repeating pattern of clusters which form a geometric array are disclosed. The axes of the passageways are offset from the overall flow axis which is essentially perpendicular to the end plane of the array and each passageway is arranged in a predetermined position. The fluid flows through the passageways with a velocity having two components including a mean flow component which is parallel to the flow axis and a nonaxial component which is perpendicular to the flow axis. Although each nonaxial component for those passageways forming any given cluster acts in a direction different from the others, they interact and cooperate with each other to induce the fluid to swirl in a generally orbital fashion around the flow axis while simultaneously advancing along the flow axis downstream of the array. The invention is adaptable to mix two or more fluids which may be either gaseous or liquid and flowing over a wide range of velocity.

15 Claims, 14 Drawing Figures

METHOD AND APPARATUS FOR MIXING FLUID

BACKGROUND OF THE INVENTION

1. Field of Invention

The present invention relates to fluids and more particularly to the mixing of fluids with an array of fluid ducts.

2. Description of the Prior Art

Manufacturers have resorted to a variety of devices and processes in order to physically mix or chemically react starting ingredients in the production of specific end products. Very often after a process has been evolved, a concerted effort is expended in improving the process in order to improve on the profitability of such a process. One collection of apparatus and techniques used in the manufacture of particulate solids is described in U.S. Pat. No. 3,499,476 entitled Spray Drying of Liquids to Form Particulate Solids. Fundamentally, the invention is directed toward improving the rate at which the certain solids can be manufactured and involves the use of three concentric spray rings which direct a working medium passing therethrough at an angle to the overall flow axis of the apparatus. Control of the spray pressures and the resulting cone pattern provides the improved performance.

A structurally different device which is initially suggestive of a plurality of nozzles for expanding gas in a direction which is not parallel to the overall flow axis is shown in U.S. Pat. No. 3,860,885 entitled Gas Laser Expansion Nozzles. At the heart of the invention is a plurality of nozzles for expanding gas to supersonic velocity with each nozzle having a throat region which is offset from the throat region of each adjacent nozzle. The expansion surfaces which define each nozzle are formed on elements which are asymmetric, although each nozzle is actually a two dimensional nozzle having an axis of symmetry and a skewed exit plane. The device is not used primarily to mix or react fluids, rather the purpose of having the nozzle throat offset is to avoid having the downstream shock waves from each of the nozzles reinforce one another, a concept very useful in gas laser systems.

Another invention having structure to induce mixing is described in U.S. Pat. No. 3,671,882 entitled Apparatus for Mixing Gas in a Fluid Mixing Laser. In this system, a first gas is flowed through a conduit having a plurality of hollow airfoil sections perpendicular to the flow. Interconnecting the airfoils is a series of tubular conduits containing small holes such that a second gs can be introduced into the main stream through the conduits essentially throughout the entire volume of the main stream, thereby permitting relatively quick and complete chemical reaction between the primary stream and the admixed gas. The system is considered applicable to chemical laser devices wherein rapid and complete mixing of the reactants is desired in order that the excited reaction species can be more fully exploited before natural processes deplete the usefulness of the reacted species.

In U.S. Pat. No. 3,174,282 entitled Asymmetrical Jet Nozzle Noise Suppressor, the inventor discloses an apparatus intended to reduce the characteristic noise level of an operating jet engine. The apparatus comprises an exhaust nozzle including a conventional upper portion and an unconventional lower portion comprising a plurality of divergent flutes which extend axially. The flutes point away from the axial centerline of the exhaust nozzle and during operation of the engine, the exhaust gas passing through the lower portion of the overall nozzle mixes with the environmental air immediately downstream of the nozzle thereby resulting in a decrease in the noise level associated with the exhaust gases.

A Skewed Exit Plane Nozzle System for optimum thrust is described in U.S. Pat. No. 3,604,628. The physical apparatus has some similarities to the devices described above and includes a plurality of nozzles having a skewed exit plane which used in combination to maximize the thrust in a propulsion system. The nozzles are rotatably mounted about their base and each has a skewed exit plane. In an application in which four nozzles are used cooperatively, each is located ninety degrees from the other in a circular pattern and arranged with the exit plane of each nozzle essentially parallel to the direction of motion of the vehicle being propelled. Since the nozzles are rotatable the projected area can be varied with ambient pressure thereby allowing an optimization of thrust from the nozzle cluster over a wide range of operating conditions.

A generally related device which is also applicable to rocket engine technology is described in U.S. Pat. No. 3,625,435 entitled Dual Orifice Quadruplet Impingement Injector. The invention is addressed to the problems of providing thorough mixing of reactants and a uniform mixture ratio over a wide range of performance conditions. The essence of the disclosure is an injector head design wherein clusters of four openings are cooperative. The holes are formed so that the working fluid is injected at an angle to the exit plane of the injector head and at locations such that the appropriate corner hole from each of four clusters of openings arranged in a suitable pattern cooperate with each other to enhance mixing. In addition, each opening contains internal means for providing fluid intended to be mixed with a second fluid which is passed around the internal means as both fluids are expelled from the injector head.

SUMMARY OF THE INVENTION

An object of the present invention is to enhance the mixing of fluids as well as the homogenuity of the mixture.

According to the present invention, a first fluid is channeled through a duct having its centerline axis nonparllel with respect to the flow axis while a second fluid is channeled through a second duct also having its centerline axis nonparallel with respect to the flow axis so as the fluid in each duct advances long the centerline axis, a nonaxial component of velocity which is a vector in a plane perpendicular to the flow axis is formed with adjacent nozzles being oriented to allow the nonaxial components of the fluid from each duct to entwine the first and second fluid. In one embodiment, the ducts or nozzles are located adjacent to each other in an array whch includes a cluster of four nozzles in a repeating pattern wherein a first fluid flows through two each of such nozzles and a second fluid flows through two each of such nozzles with the nozzles in the clusters oriented to have cooperation among the nonaxial component of velocity for each nozzle thereby inducing the two fluids to swirl about the flow axis while moving away from the nozzles, the array oriented to cause adjacent clusters to interact and the direction of adjacent swirls to be opposite in direction.

The precise shape and orientation of the individual elements used in the present invention to create the nonaxial component of velocity is not critical although definite characteristics and limits do exist. For some chemical laser operations, nozzles having a convergent divergent contour expand fluids to supersonic velocity. Each such nozzle is essentially symmetric about a centerline axis passing through the throat and exhaust plane of the nozzle, and the centerline axis forms an angle usually in the range of between 2° and 85° with the overall flow axis of the system. Nozzles having either a circular or a rectilinear cross sectional contour are suitable and fluid is delivered under pressure to the nozzles from common manifolds. The Reynolds Number for the flow, the diameter of each nozzle, and the ratio of the velocities of each fluid component are determinative of the exact flow pattern and mixing.

Some of the primary advantages of the present invention include increases in the amount of diffusion area or the turbulent mixing surface, as the case may be, of the two fluids being mixed. In addition, the local concentration gradients of the fluids are enhanced. The diffusion or mixing of the fluid occurs more rapidly and more completely due to the entwinement of the fluids and results in a higher degree of mixing and homogenuity of the mixture than are achieved with prior techniques. In applications involving chemical reactions between two fluids, a more rapid and complete reaction between constituents of the stream is realized and in a chemical laser system in particular, these reactions are accomplished before the population inversion depletes itself by decay processes. The shape of the nozzles conforms with conventional design criteria rendering the nozzle plate relatively simple and inexpensive to build.

The foregoing and other objects, features and advantages of the present invention will become more apparent in the light of the following detailed description of a preferred embodiment thereof as is discussed further herein and illustrated in the accompanying drawing.

DESCRIPTION OF THE PREFERRED EMBODIMENT

The apparatus which is used in the practice of the present invention can assume various physical forms depending on the nature of the application to which it is applied. For example, both gaseous and liquid fluids can be used as the working medium with the through flow passages being convergent subsonic nozzles, convergent divergent supersonic nozzles and in some instances simple ducts. Fr the purpose of describing a preferred structure and its method of operation, an apparatus having a circular geometry supersonic nozzle such as is shown in FIGS. 1, 2 and 4 is described herein.

Figure 1:
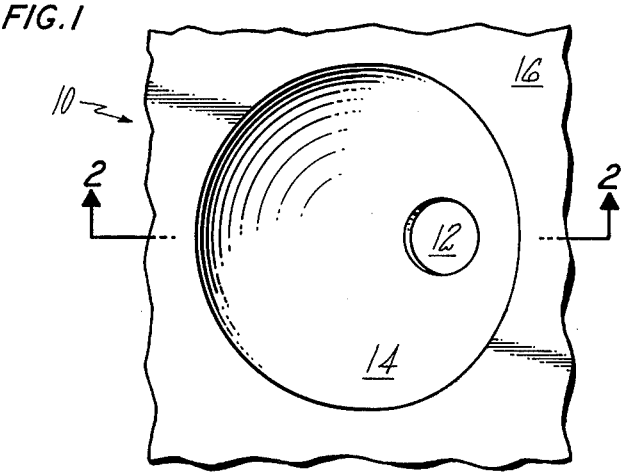
FIG. 1 is a simplified sketch of a conical supersonic nozzle element as viewed from the exhaust plane in an application in accordance with the present invention.
Figure 2:
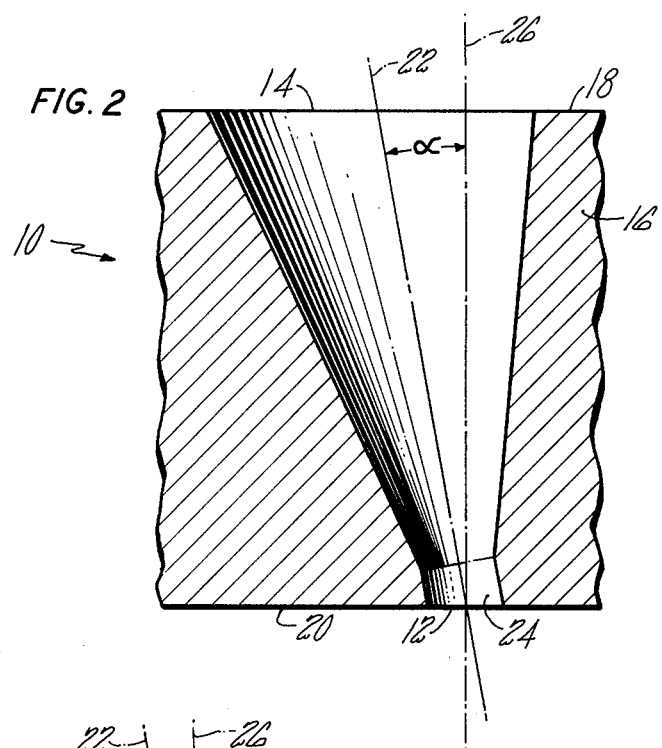
FIG. 2 is a sectional view in the direction 2—2 taken through the center of the nozzle shown in FIG. 1.
Figure 3:
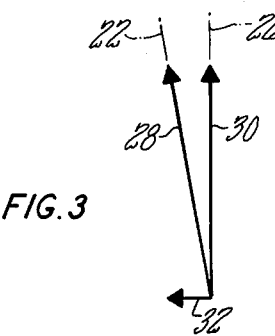
FIG. 3 is a vector diagram showing the direction and relative magnitude of the velocity of the fluid at the exit plane of the nozzle.

A nozzle element 10 having an inlet plane 12 and an exhaust plane 14 formed in a nozzle plate 16 is shown in FIGS. 1 and 2. The plate includes a downstream surface 18 which is coincident with the exhaust plane 14 and an upstream surface 20. The nozzle includes a centerline axis 22 and a throat region 24. Perpendicular to the nozzle plate surface is a flow axis 26 which forms an included angle with the centerline axis. The nozzle element is circular in any cross section which is taken perpendicular to the centerline axis. Thus a vector diagram in the plane formed by the centerline axis and the flow axis such as is shown in FIG. 3 results if a gas is expanded across the nozzle. A velocity vector 28 for the nozzle occurs along the centerline axis and can be reduced to a mean flow component 30 of velocity and a nonaxial component 32 of velocity.

Figure 4:
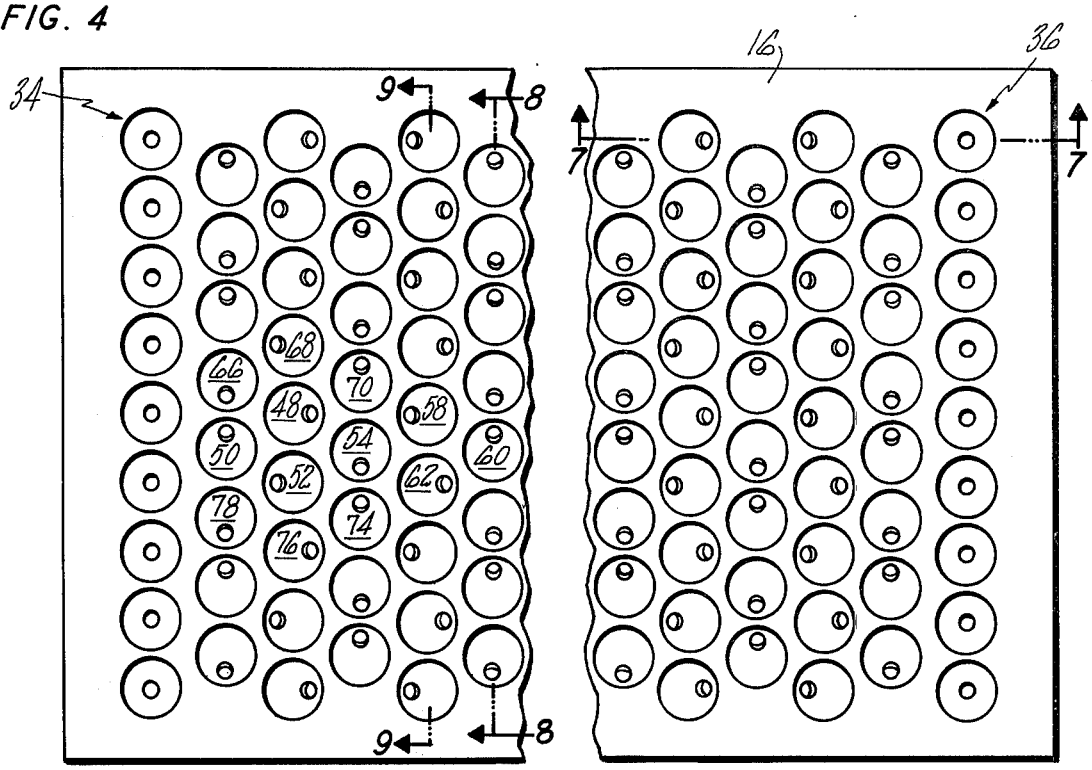
FIG. 4 is a simplified view of a nozzle plate showing a nozzle array and their cooperating orientation.

The nozzle plate 16 is shown in FIG. 4 as viewed from the downstream side. In this array, the nozzles are arranged in clusters of four with each nozzle being oriented to allow the nonaxial components of velocity to interact to produce mixing and orbital swirl which is described further hereinafter. The nozzle array shown includes a leftmost column 34 and a rightmost column 36 both having all nozzle elements oriented with the centerline axes of each nozzle parallel to the flow axis, a feature which allows separation of the flow mediums from components on the wall by the injection of an inert gas. A sketch of the nonaxial component produced at each nozzle location shown in FIG. 4 is provided on the corresponding plate arrangement in FIG. 5. Many rectangular patterns comprising four nonaxial components can be recognized in FIG. 5 and the clockwise or alternatively counterclockwise orientation of each component in the array is apparent.

Figure 5:
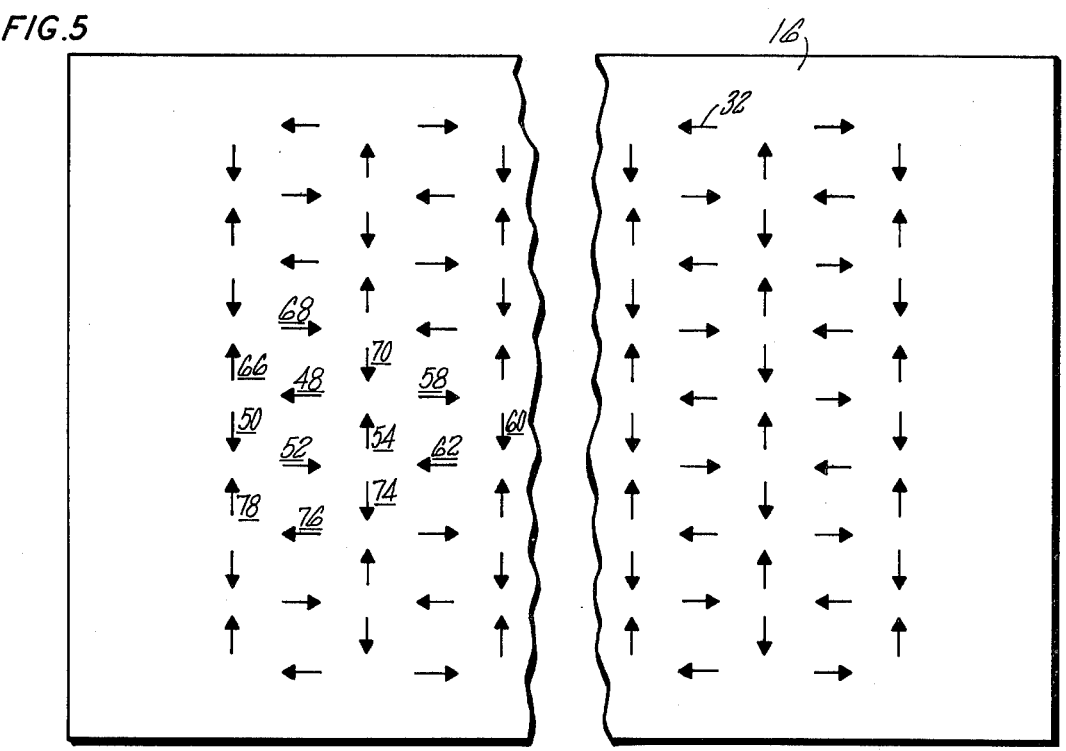
FIG. 5 is a sketch showing the direction of the side component of velocity produced in each of the nozzles shown in FIG. 4 as present in the exhaust plane.
Figure 6:
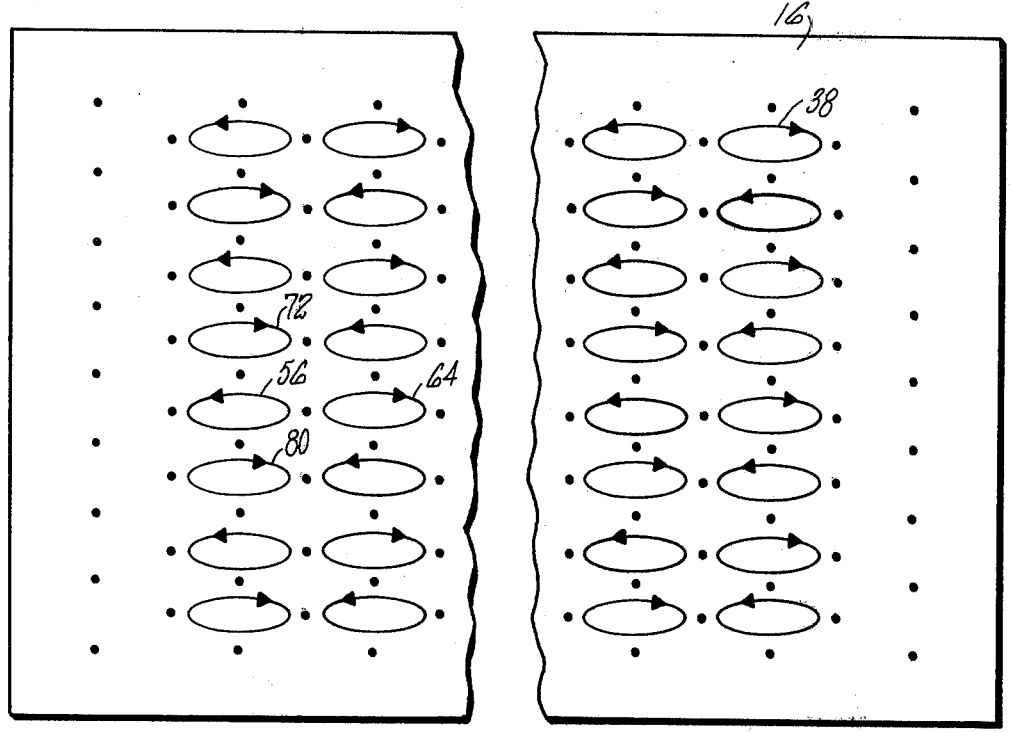
FIG. 6 is a simplified sketch showing the directions of induced swirl resulting from the nozzle array in a plane which is parallel to the exhaust plane.

FIG. 6 is another representation of the nozzle plate 16 with a dot used to represent the point at which the centerline axis for each nozzle intersects the plane of the downstream surface on the nozzle plate. On the basis of the convention shown in FIG. 5, the nonaxial components interact to induce a swirl pattern 38 about the flow axis. The swirls are alternately clockwise and counterclockwise when proceeding in either the vertical or horizontal direction across the nozzle plate.

Figure 7:
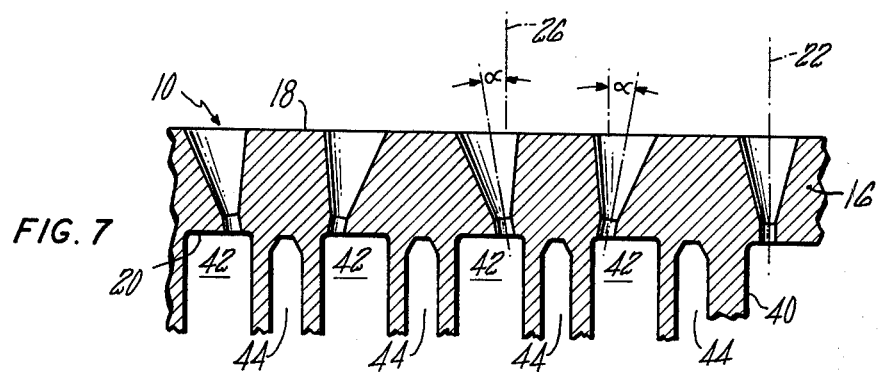
FIG. 7 is a sectional view in the direction 7—7 taken through a horizontal row of the nozzle array of FIG. 4 showing the orientation of several adjacent nozzles including one end nozzle.

FIG. 7 is a horizontal sectional view taken through the top row of the nozzle elements shown in FIG. 4. The relative size, orientation and position of a repeating pattern in this row is apparent from the figure. The flow axis 26 is perpendicular to the downstream surface 18 of the nozzle plate and the orientation of each of the nozzles which is positioned to cooperate with adjacent nozzles and induce swirl is determined relative to the flow axis. The nozzle at the extreme right is in the rightmost column 36 and therefore has a centerline axis parallel to the flow axis. Proceeding right to left in FIG. 7, each nozzle has a centerline axis offset which is alternately right of the flow axis and left of the flow axis by an offset angle which is predetermined. The nozzle plate is supported by a structural rib 40 and each nozzle element 10 connects to supply element 42 which is used to provide working fluid to the nozzles. All of the offset nozzles in this row provide a nonaxial velocity component which is either to the left or the right in the exhaust plane 14.

Figure 8:
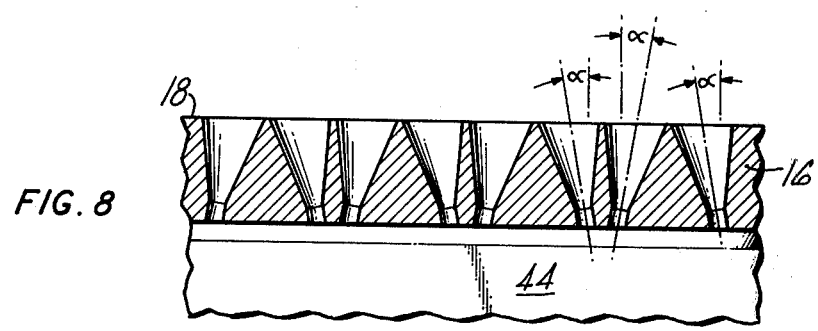
FIG. 8 is a sectional view in the direction 8—8 taken through a column of the nozzle array of FIG. 4 showing the relative orientation and spacing of vertically aligned nozzles which provide side components of velocity in the vertical direction.

FIG. 8 is a vertical section taken through a typical column of nozzles and is drawn to the same approximate proportions as the previously described nozzles. The section line passes through the center of each of the nozzle throats and shows the orientation in an upward or downward direction of each nozzle centerline with respect to the flow axis. Each nozzle is fed from a common manifold 44.

Figure 9:
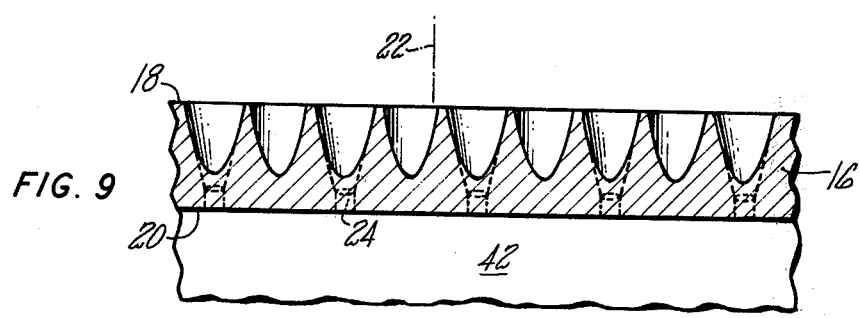
FIG. 9 is a sectional view in the direction 9—9 taken through a column of the nozzle array of FIG. 4 showing the relative orientation and spacing of vertically aligned nozzles which provide side components of velocity in the horizontal direction.

FIG. 9 is a section view analogous to FIG. 8 representing vertical columns with the nozzles oriented with their centerline axis oriented either left or right of the flow axis. Such orientation is in contrast to the upward or downward displacement which the nozzle centerline axes make with the flow axis for the vertical columns on either side thereof. Since the section is taken through the center of each nozzle element at the exhaust plane 14, the section line does not pass through the throat region 24 of any nozzle. Each nozzle is fed from a common manifold 42.

Figure 10:
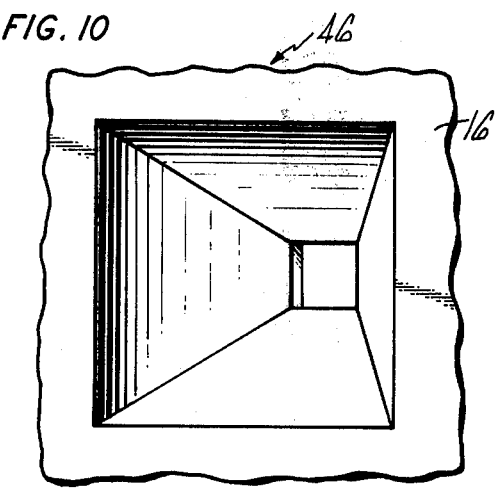
FIG. 10 is a sketch showing a rectilinear nozzle element useful in the present invention.

FIG. 10 shows an alternate structure to the essentially conical supersonic nozzle element discussed above. The nozzle plate 16 is configured to include rectilinear nozzles 46 which are essentially rectangular in cross section. This and other configurations are readily substitutable for the round nozzle elements from a mixing performance consideration.

Figure 11:
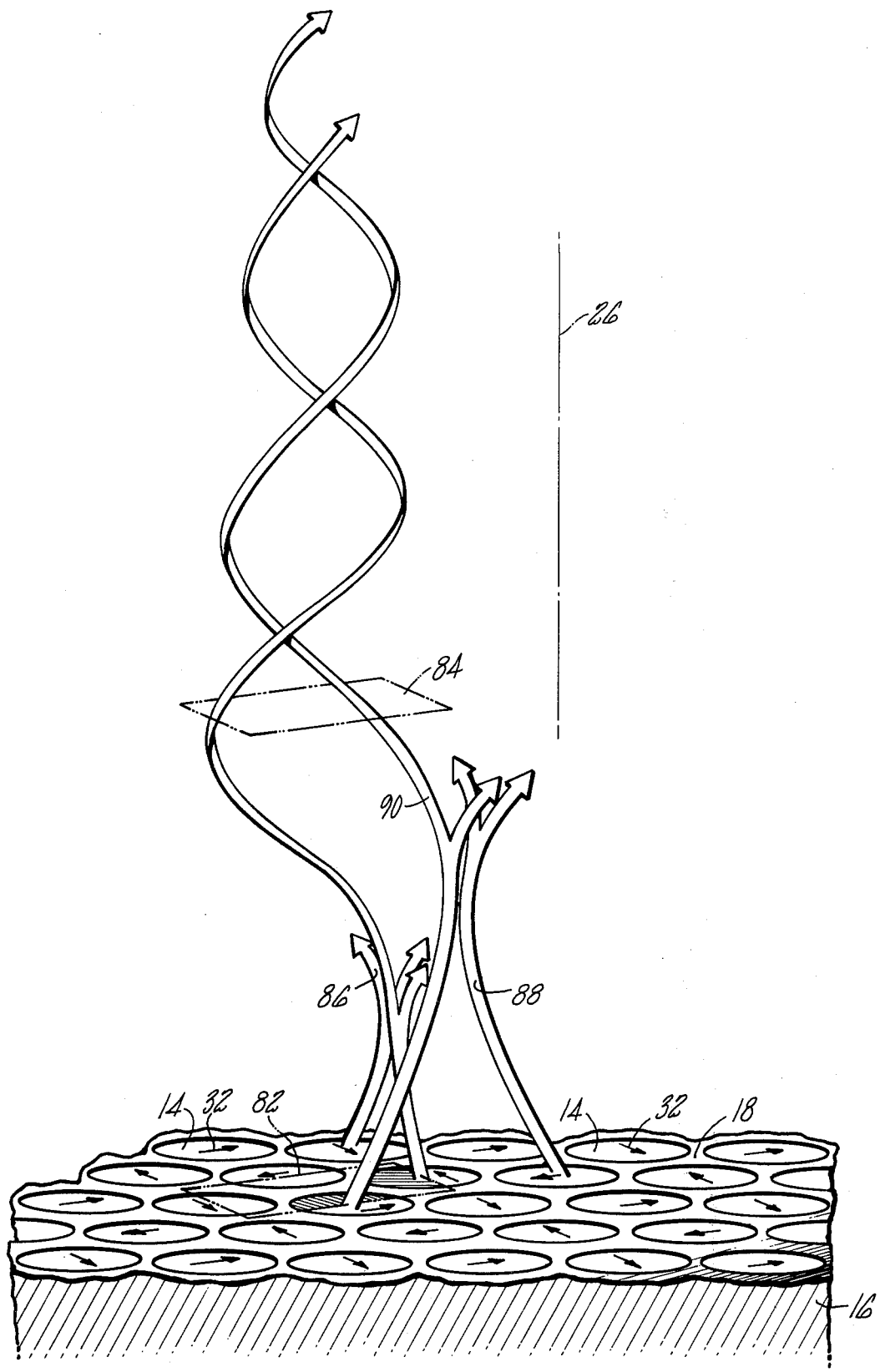
FIG. 11 is a schematic perspective view showing typical stream surfaces in the mixing pattern which results from the apparatus shown in FIG. 4.

FIG. 11 is a conceptual sketch which attempts to visualize the direction of flow of the working fluid from a group of several cooperating nozzle elements and the entwinement of the effluent from each nozzle element as it passes downstream advancing along the flow axis 26. The downstream surface 18 of the nozzle plate 16 is drawn in perspective and a typical pattern of nonaxial components 32 of velocity of the working fluid is indicated each in its own exhaust plane 14. The nozzle array shown is consistent with that described in FIGS. 4-6 wherein representative nozzle positions 48, 50, 52 and 54 comprise a first nozzle cluster which induces a counterclockwise swirl pattern 56. Similarly nozzle positions 54, 58, 60 and 62 comprise a second nozzle cluster which is adjacent to the side of the first and induces a clockwise swirl path 64. The first and second clusters have the nozzle position 54 in common. Also nozzle positions 48, 66, 68 and 70 comprise a third cluster which is adjacent to the top of the first and induces a clockwise swirl pattern 72, the first and third clusters having the nozzle position 48 in common. Further nozzle positions 52, 74, 76 and 78 comprise a fourth cluster which is adjacent to the bottom of the first and induces a clockwise swirl 80, the first and fourth clusters having the nozzle position 52 in common. This description establishes a sequence which repeats itself across the nozzle plate in which each pair of adjacent clusters shares one common nozzle and each swirl pattern has a rotational direction opposite in direction to the patterns adjacent to it.

In FIG. 11 a typical rectilinear cell 82 for a nozzle cluster is outlined. The fluid flow within the cell is half of the total effluent from each nozzle element and two nozzle elements are shaded to represent the portion of the nozzle feeding into the cell. The boundary of the cell 82 is shown at a downstream location 84 and the stream surfaces shown downstream of the location are contained within the cell.

Acutally the fluid from each nozzle element becomes divided and flows into two adjacent cells as the effluent from pairs of nozzle elements having nonaxial velocity components which act parallel to each other but in opposite directions impact and interact with each other. A first stream surface 86 and a second stream surface 88 are illustrative of this sequence. The fluid from other portions of each nozzle form stream surfaces such as 90 which become rapidly entwined in the cell, the rapidity of entwinement being a function of the origin of the stream type and the flow parameters for each constituent of the fluid flowing through the nozzles.

Figure 12:
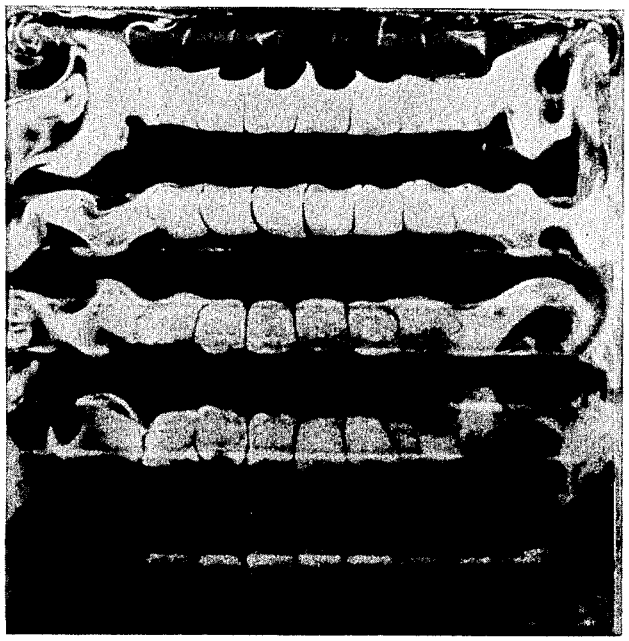
FIG. 12 is a photograph showing the flow pattern in a plane parallel to the exit plane from an array of nozzles oriented with their centerline axis parallel to a common flow axis.
Figure 13:
FIG. 13 is a photograph showing the flow pattern for the substantially same apparatus with an angle of fifteen degrees between the centerline axis of each nozzle and the flow axis with nonaxial components of velocity oriented according to FIG. 5.

Various tests have been conducted to demonstrate both the entwinement and mixing principles of the present invention and their application particularly in the chemical laser field. Flow visualization studies using water as the working fluid and a flourescent dye as a trace material have demonstrated the mixing principle. Typical photograph reproductions in FIGS. 12 and 13 provide respectively a visualization of the lack of mixing obtained with previous nozzle configurations, and the improved mixing obtained with the present invention. The test apparatus consists of a transparent flow chamber approximately six inches square in cross section and thirty inches long with plenums for two fluids and one hundred and twenty one constant area nozzles each three eighths of an inch in diameter. The nozzle plate was installed at one end of the flow chamber, each nozzle axis forming an angle of fifteen degrees with the flow axis and the nonaxial component of velocity oriented to produce an overall vector orientation as shown in FIG. 5. During the test, dye was added only to those nozzles which produced a nonaxial component in velocity in the vertical direction and the photographs were obtained by illuminating a plane perpendicular to the flow axis three inches downstream from the nozzle plate. This position is approximately by the downstream station 84 shown in FIG. 11. The flourescent dye appears light in the photographs. All of the nozzles have approximately the same water velocity and a Reynolds Number, based on average velocity and nozzle exit diameter, of approximately one hundred and twenty five.

FIG. 12 shows the mixing pattern for two fluids passed through a nozzle plate constructed with the centerline axis for each nozzle being parallel to the flow axis. The flow pattern in the center regions indicates that the principal interface between the dyed and unaltered fluid is essentially a straight line. By way of contrast, FIG. 13 shows the flow pattern at the same stream location for substantially the same flow conditions with the exception that the centerline axis for each nozzle was offset from the flow axis by approximately 15° in accordance with the present invention. The mixing pattern shows the interface surface area between the dyed and unaltered fluid increased by a factor of approximately two and one half. The increase is due to the interaction of the streams and the entwinement which occurs when the nozzles are clustered and offset from the flow axis.

In many of the current laser applications, particularly those using devices involving chemical interactions, the low rate of mixing which results from these devices and concomitant low rate of reaction between the reactants unnecessarily limits the power density in the working medium and the power output of the overall laser device. In most current chemical laser systems using supersonic nozles to inject a first and second reactant into the reaction chamber the physical transport between such reactants is essentially by laminar diffusion in which the diffusion rate in pounds per second is proportional to the interface surface of the mixing streams multiplied by the spacial derivative of the concentration of each reactant. Although some small scale nozzles cn provide an improvement over the rates of reaction and mixing available with the prior devices, such small scale equipment requires extremely careful and difficult machining which results in their cost becoming so high that while the device may be workable, it has not been used extensively. One such small scale nozzle design involves a two dimensional nozzle array in which alternate nozzles expand a primary fluid or a secondary fluid and a tertiary fluid is injected into the flow at an angle to the flow axis. Any mechanisms for enhancing the diffusion rate can be beneficial to the operation of chemical lasers.

Figure 14:
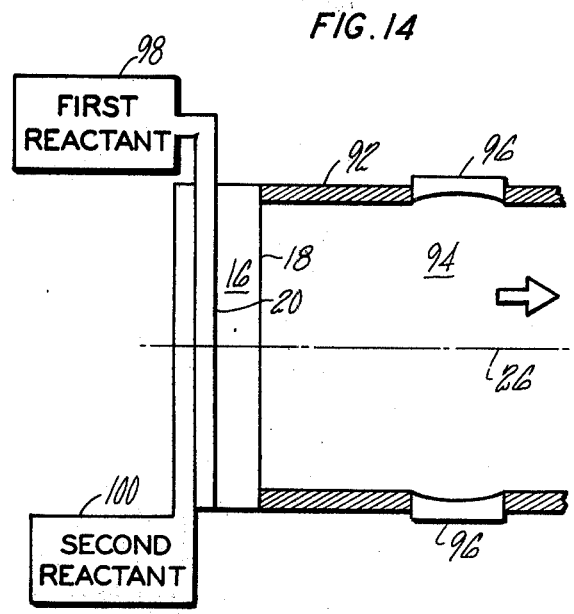
FIG. 14 is a simplified sketch showing a nozzle plate having a nozzle array in accordance with the present invention in a chemical laser application.

In the simplified apparatus shown in FIG. 14, the nozzle plate 16 is shown upstream of a conduit 92 having an optical cavity 94 formed between mirrors 96. A source 98 of ethylene, fluorine and helium is connected to the upstream surface of the nozzle plate by suitable piping and the operation of such a laser is described with reference to FIGS. 7-9. The gases comprising 0.0049 pounds per second of fluorine and 0.0003 pounds per second of ethylene undergo reaction in a combustor. Their reaction products are added to 0.0017 pounds per second of helium and then flowed into the nozzle plate through the common manifold 44 as a primary reactant while a secondary reactant comprising 0.0031 pounds per second of helium and 0.0012 pounds per second of deterium from a source 100 is flowed through the nozzle plate through the individual supply elements 42. The flow rates noted are typical of those employed in a chemical laser. However, a range of reactant and flow rates may be employed with varying degrees of success. AN extensive development of the handling and combining of reactant for chemical laser systems is provided in a related U.S. Pat. No. 3,701,045 entitled Chemical Mixing Laser and assigned with the present invention to a common assignee. The gas is mixed very rapidly in accordance with the present invention and in the opticl cavity located approximately three inches downstream of the nozzle plate stimulated emission of laser radiation occured. The optical output from such a system is very good.

In a typical chemical laser application, the Reynolds Number of gases varies between one hundred and ten thousand and the range of the velocity from individual nozzles does vary by a factor of up to three. The nonaxial component of velocity induced in the flow by each of the nozzles causes flow from the nozzles to become entwined therey incresing both the diffusion area and the local concentration gradients of the reactants. As the primary and secondary reactants diffuse very rapidly into one another, a more rapid and complete reaction takes place betwen the two streams.

In one system which was run, the nozzle plate was formed from a piece of rectangular metal approximately one inch by eight inches in cross section. The plate was nominally a quarter of an inch thick and contained an array of approximately six hundred and forty nozzles, each nozzle being approximately one tenth of an inch in diameter and having a throat diameter of twenty five mils. The nozzles were formed into clusters of four with the center of the two end nozzles spaced approximately a quarter of an inch apart and the centers of the top and bottom nozzles being separated by approximately half this distance. The centerline axis of the nozzles were offset approximately ten degrees with respect to the flow axis, although this angle can vary anywhere from between 2° and 85° with many applications in the supersonic nozzles falling into the range of 3° to 15° and applications with subsonic or sonic nozzles falling into the range of 10° to 60°. For less than approximately 10°, the larger this angle becomes the greater the diffusion surface is believed to become for a given distance from the exhaust plane. However, for each application, an optimum angle range is expected to exist and the particular angle at which each nozzle element is offset from the flow axis will vary depending upon the fluids and reaction involved. For example, in the case of a supersonic nozzle, the optimum angle, nozzle exit Mach number, base to nozzle exit area ratio, and array pattern are influenced by the interaction of flow in the nozzle exit region with the flow in the downstream passages. One further very practical constraint is the manufcturing technology which could be brought to bear in constructing such nozzle plates. As a general statement, the optimum angle for the fastest increase of diffusion surface area is the largest angle between the centerline and the flow axis which does not conflict with any of the mentioned considerations.

The present invention is applicable to the concept of chemical mixing in general and applicable in particular to specific devices such as chemical lasers and combustors. Two or more fluids may be mixed with the methods and apparatus of the invention and the fluids may be either gaseous or liquid. Further, depending upon the particular application, the ducts through which the fluid is flowed in order to develop the necessary nonaxial velocity of component can either be nozzles of the subsonic or supersonic variety or simply passageways in which no substantial acceleration occurs. While the system which has been developed most fully in this description is based on a repeating cluster of four nozzles in a generaly rectiliner planar array, the repeating cluster need not necessarily be limited to this number of nozzles and the array can vary as well.

Although the present invention has been shown and described with respect to preferred embodiments thereof those skilled in the art should understand that various changes and omissions in the form and details thereof may be made therein without departing from the scope of the invention.

Having thus described a typical embodiment of my invention, that which I claim as new and desire to be secured by Letters Patent of the United States is:

1. A method for producing a flow pattern in fluid with ducts which are grouped into adjacent clusters and connected to a common discharge region having a flow axis which defines an average flow direction and a swirl axis wherein the method includes the steps of:

delivering fluid to a first duct which is a member of a first cluster and has an exit plane and a centerline axis which is not parallel to the flow axis;

flowing fluid through the duct to produce a velocity component in the average flow direction and a nonaxial velocity component which is perpendicular to the flow axis in the exit plane;

delivering fluid to a second duct which is a member of the cluster and has an exit plane and a centerline axis which is not parallel to the flow axis;

flowing fluid through the second duct to produce a velocity component in the average flow direction and a second nonaxial component which is perpendicular to the flow axis at the exit plane and has a vector direction different from the vector direction of the first nonaxial component; and flowing the fluid from the ducts into the discharge region to allow interaction between the fluid from adjacent clusters while the fluid from the ducts in the first cluster becomes circularly entwined about the flow axis during passage through the discharge region, fluid from each duct flowing into two adjacent clusters to thereby allow the fluid to form a swirl pattern about the swirl axis for each cluster, adjacent clusters having swirl directions which are opposite to each other and the direction for each swirl for each cluster having the same velocity direction at any common boundary between adjacent clusters.

2. The method according to claim 1 wherein the ducts comprising the first cluster form a geometric pattern which is repeated periodically to form an array.

3. The method according to claim 1 wherein each cluster comprises four ducts and including the further steps of delivering fluid through a third duct which is a member of the first cluster and has an exit plane and a centerline axis which is not parallel to the flow axis;

flowing fluid through the third duct to produce a velocity component in the average flow direction and a nonaxial velocity component which is perpendicular to the flow axis at the exit plane;

delivering fluid to a fourth duct which is a member of the first cluster and has an exit plane and a centerline axis which is not parallel to the flow axis;

flowing fluid through the fourth duct to produce a velocity component in the average flow direction and a nonaxial component which is perpendicular to the flow axis in the exit plane; and flowing the fluid from the third and fourth ducts into the discharge region.

4. The method according to claim 3 wherein the four ducts comprising the first cluster form a geometric pattern in a planar assembly and the pattern is repeated periodically to form a planar array.

5. The method according to claim 4 wherein a first fluid is delivered to the first and third ducts and a second fluid is delivered to the second and fourth ducts.

6. The method according to claim 4 wherein a different fluid is delivered to each of the four ducts.

7. An apparatus having flow passageways grouped into clusters located adjacent to each other in an assembly which is substantially perpendicular to the flow axis wherein the apparatus comprises:

a plurality of clusters each including;

a first passageway having a centerline axis which is not parallel to the flow axis; and a second passageway adjacent to the first and having a centerline axis which is not parallel either to the flow axis or to the axis of the first passageay; and means connecting the first and second passageways of each cluster to a first and second source of fluid wherein the flow of fluid through each passageway assumes a side component of fluid velocity which is perpendicular to the flow axis and the fluids exiting the assembly mix, the centerline axis of the passageways oriented to form a geometric array such that fluid exiting each first and second passageway in any one cluster interacts and causes the fluid to swirl in a rotating pattern about the flow axis, with the swirling fluid from adjacent clusters interacting and the direction of swirl created by each cluster being opposite in direction to the swirl of each cluster adjacent thereto.

8. For mixing fluids, apparatus including a plurality of nozzles located in an assembly which is substantially perpendicular to a flow axis passing through a flow region adjacent to the assembly with the nozzles forming a repeating pattern of clusters each of which comprises:

four nozzles each having a centerline axis of symmetry which forms an angle with the flow axis;

means connecting the first and third nozzles to a source of first fluid; and means connecting the second and fourth nozzle to a source of second fluid, each nozzle in the cluster oriented to provide a nonaxial component of velocity to fluid passed therethrough, such nonaxial component for each nozzle being perpendicular to the flow axis with the components for the first and third nozzles being substatially parallel but opposite in direction to each other and the components for the second fourth nozzles being substantially parallel but opposite in direction to each other, the direction of the first and third components being substatially perpendicular to the direction of the second and fourth components.

9. The invention according to claim 8 wherein the angle which each centerline axis of symmetry makes with the flow axis is less than 85°.

10. The invention according to claim 9 wherein the nonaxial component for all the nozzles in each cluster induces fluid passing through the cluster to swirl in a rotary pattern about the flow axis.

11. The invention according to claim 10 wherein the direction of the rotary pattern for any two adjacent clusters of nozzles is opposite in direction to each other.

12. The invention according to claim 8 wherein each pair of adjacent clusters has a single common nozzle element and each nozzle has a centerline axis forming an acute angle to the flow axis.

13. The invention according to claim 12 wherein each of any four nozzles forming a cluster are in a pattern with the centerline spacing distance between the first and third nozzles approximately twice the spacing distance between the second and fourth nozzle.

14. The invention according to claim 13 wherein the first and third nozzles have a common supply of first reactant and the second and fourth nozzles have a common supply of second reactant.

15. The invention according to claim 12 wherein the acute angle for each nozzle element is between 3° and 60°.

* * * * *

UNITED STATES PATENT AND TRADEMARK OFFICE
CERTIFICATE OF CORRECTION

PATENT NO. : 4,116,383
DATED : September 26, 1978
INVENTOR(S) : BRUCE VIRGIL JOHNSON It is certified that error appears in the above-identified patent and that said Letters Patent are hereby corrected as shown below:

Column 1, line 50   "gs" should read -- gas --

Column 2, line 47   "nonparllel" should read -- nonparallel --

Column 4, line 31   "Fr" should read -- For --

Column 6, line 62   "approximately" should read -- approximated --

Column 7, line 25   "nozles" should read -- nozzles --

Column 7, line 31   "cn" should read -- can --

Column 8, line 11   "therey" should read -- thereby --
"incresing" should read -- increasing --

Column 8, line 66   "generaly" should read -- generally --
"rectiliner" should read -- rectilinear --

Column 9, line 40   "each" second occurrence should read -- such --

UNITED STATES PATENT AND TRADEMARK OFFICE
CERTIFICATE OF CORRECTION

PATENT NO. : 4,116,383
DATED : September 26, 1978
INVENTOR(S) : BRUCE VIRGIL JOHNSON It is certified that error appears in the above–identified patent and that said Letters Patent are hereby corrected as shown below:

Column 10, line 48 after "second" insert -- and --

Signed and Sealed this

Thirtieth Day of January 1979

[SEAL]

Attest:

RUTH C. MASON
Attesting Officer

DONALD W. BANNER
Commissioner of Patents and Trademarks